United States Patent [19]

Love

[11] 3,874,780
[45] Apr. 1, 1975

[54] COUPLER FOR OPTICAL COMMUNICATION SYSTEM
[75] Inventor: Roy E. Love, Corning, N.Y.
[73] Assignee: Corning Glass Works, Corning, N.Y.
[22] Filed: July 5, 1973
[21] Appl. No.: 376,576

[52] U.S. Cl. .................. 350/96 WG, 350/96 C
[51] Int. Cl. ............................................ G02b 5/14
[58] Field of Search.......... 350/96 R, 96 B, 96 WG; 250/199

[56] References Cited
UNITED STATES PATENTS
3,229,106   1/1966   De Lord et al............. 350/96 R UX
3,455,625   7/1969   Brumley et al. ............... 350/169 X
3,751,670   8/1973   Grodner et al. .................... 250/199
FOREIGN PATENTS OR APPLICATIONS
1,017,354   1/1966   United Kingdom........... 350/96 WG Primary Examiner—John K. Corbin
Attorney, Agent, or Firm—William J. Simmons, Jr.; Clarence R. Patty, Jr.

[57] ABSTRACT

An optical signal coupler for use between a single optical signal transmission line and a plurality of such transmission lines. The coupler comprises an elongated cylindrically shaped rod of transparent material having first and second substantially parallel endfaces having anti-reflection coatings disposed thereon. Support means disposes the ends of the plurality of transmission lines in a bundled arrangement in such a manner that the optical waveguides of which the transmission lines are comprised terminate adjacent to the first endface of the rod, the axes of the waveguides being substantially parallel to the longitudinal axis of the rod. The single transmission line is disposed in a similar manner at the second endface of the rod.

11 Claims, 4 Drawing Figures

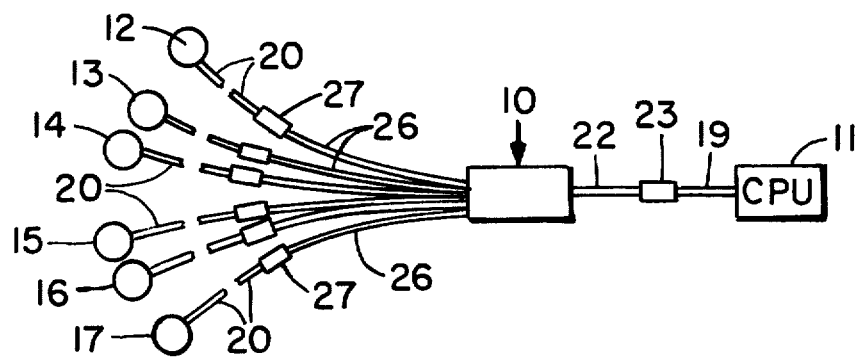
Fig. 1
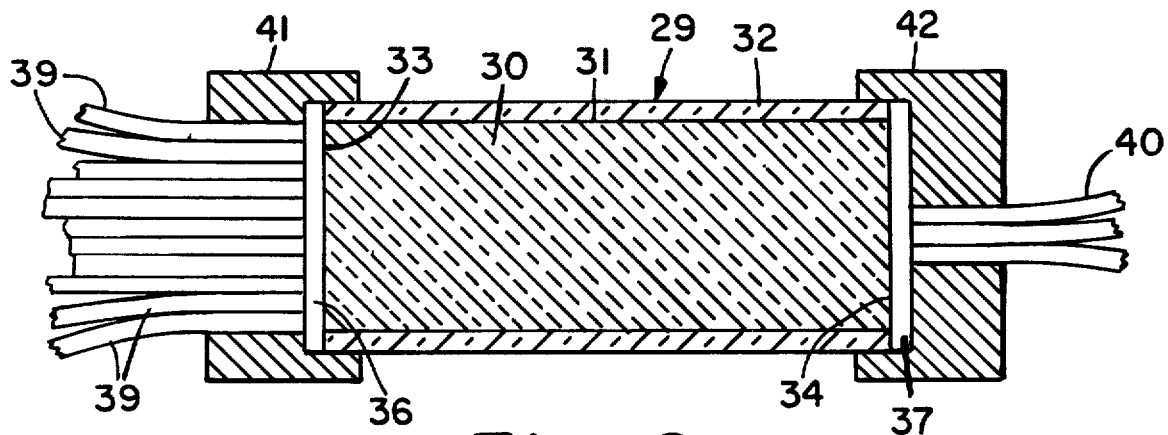
Fig. 2
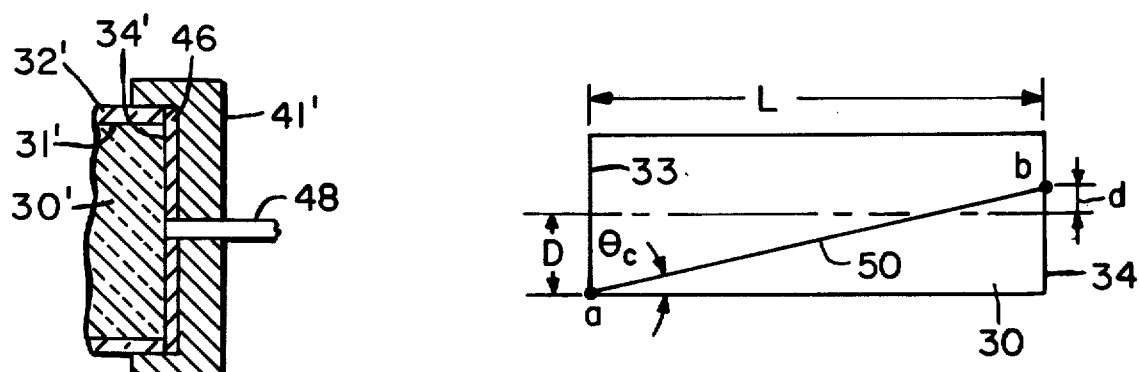
Fig. 3
Fig. 4

COUPLER FOR OPTICAL COMMUNICATION SYSTEM

BACKGROUND OF THE INVENTION

The continually increasing amount of traffic that communication systems are required to handle has hastened the development of high capacity system. Even with the increased capacity made available by systems operating between $10^9$ Hz and $10^{12}$ Hz, traffic growth is so rapid that saturation of such systems is anticipated in the very near future. High capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz.

The transmitting media required in the transmission of frequencies around $10^{15}$ Hz are hereinafter referred to as optical signal transmission lines or merely transmission lines which may consist of a single optical waveguide or a bundle thereof. Optical waveguides normally consist of an optical fiber having a transparent core having a refractive index $n_1$ surrounded by a layer of transparent cladding material having a refractive index $n_2$ which is lower than $n_1$. Although the theory of optical waveguides has been known for some time, practical optical waveguides that do not absorb an excessive amount of transmitted light have been developed only recently. For example, U.S. Pat. No. 3,659,915 discloses a low loss optical waveguide comprising a cladding layer of fused silica and a core of fused silica doped with one or more materials that selectively increase the index of refraction of the core above that of the cladding.

To establish an optical communication network between a controlling station or central processing unit (CPU) and a plurality of subscriber stations, a variety of interconnection schemes may be utilized. The CPU can be "hard wired" to the subscriber stations, but when many subscriber stations exist, the excessive amount of transmission line required causes this method to be undesirable due to both the cost of the transmission line and the space consumed thereby. A loop data bus may be employed, thereby drastically reducing the required amount of transmission line, but the large number of couplers required in such a system introduces an excessive amount of loss, especially in those systems in which there are many subscriber stations.

Copending patent application Ser. No. 376,565 entitled "Optical Communication System" filed by F. L. Thiel and R. E. Love on July 5, 1973 and assigned to the assignee of the present application is incorporated herein by reference. The optical communication network disclosed in that application takes advantage of unique properties of optical signal transmission lines and enables the interconnection of a plurality of stations with much less transmission line than that which would be required by hard wiring, and yet it is not plagued by the excessive losses encountered in the aforementioned loop data bus. In accordance with the invention disclosed in that application, a plurality of stations, including the CPU, are connected by separate transmission lines to a common passive coupler which is adapted to receive an optical signal from any one of the stations and couple a portion of that signal to the transmission line associated with each of the other stations. As disclosed in that application, each of the plurality of stations including the CPU or controlling station comprises a light detector and a light source, both of which are coupled to the optical signal transmission line extending thereto. Although this network efficiently interconnects all of the stations associated therewith, it is important in certain applications to ensure that the CPU has access to all subscriber stations and that the subscriber stations each have access to the CPU but not to each other.

SUMMARY OF THE INVENTION

Briefly, the present invention relates to a coupler for use in an optical communication system having a plurality of optical signal transmission lines which are to communicate with at least one other optical signal transmission line. Each of these transmission lines comprises at least one optical waveguide having a core of transparent material surrounded by a layer of transparent cladding material having a refractive index lower than that of the core. The coupler of the present invention, which couples optical signals between the plurality of transmission lines and the one transmission line, comprises an elongated rod of transparent material having first and second planar end-faces that are substantially perpendicular to the axis thereof. Means surrounding the rod forms with the surface thereof a light reflecting interface. First support means disposes the ends of a plurality of transmission lines in a bundled arrangement, the optical waveguides of which the transmission lines are comprised terminating in faces that are disposed adjacent to the first endface. The planar array in which the faces are disposed is substantially parallel to the first endface. Second support means disposes the end of the one transmission line adjacent to the second endface so that the axis of that transmission line is substantially parallel to that of the rod.

As used herein "transparent" indicates transparency to those wavelengths of light that are propagated by the associated optical signal transmission lines.

BRIEF DESCRIPTION OF THE DRAWINGS

FIG. 1 is a schematic illustration in block diagram form of an optical communication system employing the coupler of the present invention.

FIG. 2 is a cross-sectional view of a preferred embodiment of the present invention.

FIG. 3 is a fragmentary cross-sectional view of a modification of the embodiment of FIG. 2.

FIG. 4 is a diagram useful for calculating the minimum length of the coupler of the present invention.

DESCRIPTION OF THE PREFERRED EMBODIMENT

FIG. 1 illustrates an optical communication system wherein a central processing unit 11 is connected by coupler 10 to a plurality of subscriber stations 12 through 17. Optical signal transmission line 19 connects unit 11 to one end of coupler 10, and each of the stations 12 through 17 is connected to the opposite end of coupler 10 by transmission lines 20. Coupler 10 may include a short bundle of transmission lines 26 terminating at connectors 27 and a short transmission line 22 terminating at connector 23. Connectors 23 and 27 may be of the type disclosed in U.S. patent application Ser. No. 376,577 entitled "Optical Waveguide Connector" filed on July 5, 1973 and assigned to the assignee of the present application. This construction permits the coupler to be constructed in a factory under controlled conditions whereby the optical signal transmission lines can be properly positioned and aligned with respect to the ends of the coupler. Installation of the coupler then merely requires the connection of transmission lines 20 to connectors 27. Since connectors 23 and 27 introduce loss into the system, it may be preferable to connect and align transmission line 19 and transmission lines 20 directly to the ends of coupler 10 at the time of its installation into the system.

A cross-sectional view of a coupler constructed in accordance with the present invention is shown in FIG. 2. Coupler 29 consists of an elongated rod 30 of transparent material, the refractive index $n_3$ of which is preferably the same as that of the cores of the optical waveguides employed in the optical signal transmission lines which are connected thereto. Rod 30 is preferably in the shape of a cylinder of circular cross-section, but other suitable cross-sectional shapes may be employed. If optical waveguides such as those disclosed in the aforementioned U.S. Pat. No. 3,659,915 were utilized in the optical signal transmission lines associated with coupler 29, rod 30 could consist of doped fused silica having a refractive index equal to that of the waveguide cores or it could consist of some other transparent material having a similar refractive index. The outer surface of rod 30 should cooperate with the surrounding medium to provide an optical quality interface 31 for reflecting back into the rod any light that is incident thereon. Such an interface is preferably provided by layer 32 of transparent cladding material having a refractive index $n_4$ sufficiently lower than that of rod 30. Interface 31 could also be provided by polishing the surface of rod 30 and utilizing air as the low index surrounding medium or by disposing on the surface of rod 30 a dielectric or metallic layer which is reflective to the wavelengths of light transmitted by the optical signal transmission lines.

If a transparent cladding layer is employed to form interface 31, the refractive index of that layer must be sufficiently lower than that of rod 30 so that the numerical aperture of coupler 29 is at least as large as that of the optical signal transmission lines. If the refractive index of rod 30 is substantially the same as the cores of the optical waveguides which comprise optical signal transmission lines 30 and 40, the refractive index of cladding layer 32 should be no greater than that of the cladding of the optical waveguides.

Endfaces 33 and 34 of rod 30 are polished and are substantially perpendicular to the longitudinal axis of the rod. Endfaces 33 and 34 are provided with means such as anti-reflection coatings 36 and 37, respectively, for preventing light from reflecting from an endface and returning to that end of the rod at which it originated. The anti-reflection coatings may consist of such well known materials as magnesium fluoride and silicon monoxide. The absence of such anti-reflection means would cause the undesirable coupling of optical signals between transmission lines that are connected to one end of rod 30.

The ends of a first plurality of transmission lines 39 are disposed adjacent to anti-reflection coating 36, and the ends of a second plurality of transmission lines 40 are disposed adjacent to anti-reflection coating 37. As described in conjunction with FIG. 1, as few as one transmission line 40 may be employed. The transmission lines which are to be connected to the coupler are suitably grouped and maintained in parallel alignment while the ends of the optical waveguides of which the transmission lines are comprised are ground and polished so that each waveguide terminates in a face that is substantially perpendicular to the axis thereof, and all of the waveguide faces lie in a single plane. Also, the jackets of the transmission lines may be removed from the ends of the transmission lines which are connected to coupler 29. Support means 41 maintains transmission lines 39 in alignment with rod 30 so that the ends of the transmission lines are disposed within a region defined by the circumference of endface 34.

As illustrated in FIG. 3, wherein elements similar to those of FIG. 2 are represented by primed reference numerals, the anti-reflection means could comprise a layer 46 of light absorbing material such as paint, glass or the like disposed on that portion of endface 34' that is not in the optical path between rod 30' and transmission line 48. This figure also illustrates the connection of a single transmission line to one end of the coupler.

The function of coupler 29 is to couple a portion of the optical signal radiating from any optical waveguide located at one end thereof to all of the waveguides at the other end thereof. Reference is made to FIG. 4 which shows a diagram that is useful in the calculation of the minimum length L of a cylindrical rod capable of performing this function. This calculation applies only to the preferred embodiment wherein the bundles of transmission lines at both ends of the coupler are centrally disposed with respect to the endfaces 33 and 34. The radii of the transmission line bundles at endfaces 33 and 34 are represented as D and d, respectively. If a single transmission line terminates adjacent to endfaces 34, then d is the radius of that transmission line. The extreme ray 50 radiated by a first optical waveguide located at point a on endface 33 must illuminate a second optical waveguide located at point b on endface 34. The angular deviation $\theta_c$ of ray 50 with respect to the axis of the first waveguide, and hence with respect to the axis of rod 30, is given by the equation $$\theta_r = \sin^{-1} \frac{\sqrt{n_1^2 - n_2^2}}{n_3}$$

The angle $\theta_c$ is referred to as the acceptance half angle of the optical waveguides which comprise the optical signal transmission lines. From the diagram in FIG. 4 it can be seen that the minimum length L of rod 30 is given by the equation $$L = \frac{D + d}{\tan \theta_c}$$

A rod having a length longer than L will also provide the required illumination of all waveguides at one end by each waveguide disposed at the other end.

During operation, light from transmission lines 40 spreads upon entering rod 30 and illuminates all of the transmission line faces disposed at endface 33. Depending upon the length of rod 30, the number of transmission lines 40 and the location of those transmission lines with respect to the center of endface 34, light may reflect one or more times from interface 31 before impinging upon the ends of transmission lines 39. If the coupler is utilized in the system of FIG. 1, optical signals from the CPU reach all of the subscriber stations in this manner. Similarly, an optical signal from a subscriber station is coupled to the CPU; however, this subscriber signal does not couple to other subscriber stations due to anti-reflection means 37. Also, if more than one transmission line 40 is employed, anti-reflection means 36 prevents the coupling of optical signals between those transmission lines. Of course, a subscriber could reach one or more other subscribers that share a central coupler by first contacting the CPU which then relays the information to the other subscriber stations.

I claim:

1. In an optical communication system having a plurality of stations and at least one control station, each of said stations being adapted to transmit and receive optical signals, a coupler, a plurality of optical signal transmission lines for connecting said plurality of stations to said coupler, at least one other optical signal transmission line for connecting said at least one control station to said coupler, each of said transmission lines comprising at least one optical waveguide having a core of transparent material having a refractive index $n_1$ surrounded by a layer of transparent cladding material having a refractive index $n_2$ that is lower than $n_1$, said coupler being adapted to couple optical signals from said first plurality of transmission lines to said at least one transmission line and couple optical signals from said at least one transmission line to said plurality of transmission lines but prevent the coupling of optical signals from one to another of said plurality of transmission lines, said coupler comprising an elongated cylindrically shaped rod of transparent material of refractive index $n_3$ having first and second planar endfaces that are substantially perpendicular to the axis thereof, means surrounding said rod for forming with the surface thereof an optical quality light reflecting interface, first support means for disposing the ends of said plurality of transmission lines in a bundled parallel arrangement, the optical waveguides of which said transmission lines are comprised terminating in faces that are disposed adjacent to said first endface, said faces being disposed in a planar array that is substantially parallel to said first endface, second support means for disposing the end of said at least one transmission line adjacent to said second endface, the axis of said at least one transmission line being substantially parallel to that of said rod, and means at said first and second endfaces for preventing light from said rod from reflecting from said endfaces back into said rod.

2. An optical communication system in accordance with claim 1 wherein said means for preventing reflection comprises first and second anti-reflection coatings disposed upon said first and second endfaces, respectively.

3. An optical communication system in accordance with claim 2 wherein said means surrounding said rod comprises a layer of transparent cladding material disposed upon the surface of said rod, the refractive index $n_4$ of said cladding material being lower than $n_3$.

4. An optical communication system in accordance with claim 3 wherein the refractive index $n_1$ of said optical waveguide cores and the refractive index $n_3$ of said rod are substantially equal.

5. An optical communication system in accordance with claim 4 wherein the numerical aperture of said coupler is at least as large as that of said at least one optical waveguide.

6. An optical communication system in accordance with claim 5 wherein said rod is in the shape of a cylinder of circular cross-section.

7. An optical communication system in accordance with claim 6 wherein said plurality of transmission lines are grouped into a bundle the cross-section of which is circumscribed by a circle of radius D, the end of said bundle being centrally located with respect to said first endface, and wherein the end of said at least one transmission line is centrally located with respect to said second endface, the distance between the center of said second endface and the most remote point on the end of said at least one transmission line being d, the length L of said rod being determined by the equation $$L = \frac{D + d}{\tan \theta_c}$$

where $\theta_c$ is the acceptance half angle of said at least one optical waveguide.

8. An optical communication system in accordance with claim 1 wherein optical signal coupling means is disposed in each of said plurality of transmission lines and in said at least one transmission line.

9. An optical communication system in accordance with claim 8 wherein said at least one transmission line comprises a single transmission line and said at least one control station comprises a single station.

10. In an optical communication system comprising
a plurality of stations for transmitting and receiving optical signals,
at least one control station for transmitting and receiving optical signals,
a coupler,
a plurality of optical signal transmission lines for connecting said plurality of stations to said coupler,
at least one other optical signal transmission line for connecting said at least one control station to said coupler, each of said optical signal transmission lines comprising at least one optical waveguide having a core of transparent material having a refractive index $n_1$ surrounded by a layer of transparent cladding material having a refractive index $n_1$ that is lower than $n_1$,
said coupler being characterized in that it comprises
an elongated rod of transparent material of refractive index $n_3$ having first and second planar endfaces that are substantially perpendicular to the axis thereof,
means surrounding said rod for forming with the surface thereof an optical quality light reflecting interface,
first support means for disposing the ends of said plurality of transmission lines in a bundled parallel arrangement, the optical waveguides of which said transmission lines are comprised terminating in faces that are disposed adjacent to said first endface, said faces being disposed in a planar array that is substantially parallel to said first endface, second support means for disposing the end of said at least one transmission line adjacent to said second endface, the axis of said at least one transmission line being substantially parallel to that of said rod, and first and second anti-reflection coatings disposed upon said first and second endfaces, respectively.

11. An optical communication system in accordance with claim 10 wherein said rod is a cylinder of circular cross-section, wherein said means surrounding said rod comprises a layer of transparent cladding material disposed upon the surface of said rod, the refractive index $n_4$ of said cladding material being lower than $n_3$, wherein said plurality of transmission lines are grouped into a bundle the cross-section of which is circumscribed by a circle of radius D, the end of said bundle being centrally located with respect to said first endface, and wherein the end of said at least one transmission line is centrally located with respect to said second endface, the distance between the center of said second endface and the most remote point on the end of said at least one transmission line being d, the length L of said rod being determined by the equation $$L \geq \frac{D+d}{\tan \theta_c}$$

wherein $\theta_c$ is the acceptance half angle of said at least one optical waveguide.

* * * * *